Patented Nov. 21, 1950

2,530,458

UNITED STATES PATENT OFFICE 2,530,458

PRODUCTION OF COMPLEX INORGANIC COMPOUNDS AND APPLICATIONS THEREOF

Hans Rudolph Frisch, Caterham, England

No Drawing. Application March 18, 1947, Serial No. 735,545. In Great Britain August 19, 1946

4 Claims. (Cl. 106—15)

This invention relates to the production of complex inorganic compounds and their application for industrial or other useful purposes.

An object of the invention is the production of complex compounds the solutions of which are capable of drying out into water and fire resistant hard glossy films resembling organic polymers.

Another object is by incorporation of related compounds to manufacture products capable of forming similar films with desired characteristics as to colour or other property.

A further object is to produce varnish like paints embodying similar compounds and suitable filling materials or pigments for providing coverings of water and fire resistant character.

The invention may be said to be related to the art concerned with the solubility in hydrous ammonia of the various ortho-phosphates or ortho-arsenates of the group of elements comprising zinc, cadmium, bi-valent copper, nickel, cobalt and manganese, and silver.

The related character of phosphates and arsenates is well-known in scientific and industrial circles. So far as I am aware, however, little has been published relative to the art referred to, though it is known that the elements of the above group dissolve in varying degrees in hydrous ammonia.

It has now been found by me as the result of research that the tertiary zinc ortho-phosphates (and the tertiary zinc ortho-arsenates) can by appropriate procedure be dissolved in hydrous ammonia to form clear viscous solutions which in appearance resemble glycerol or water glass and have valuable characteristics as regards industrial and technical applications. Thus the treatment of approximately 125 parts of tertiary zinc ortho-phosphate, with 100 parts of cold concentrated hydrous ammonia, suitably 30 to 35% hydrous ammonia, yields a transparent liquid of specific gravity 1.4 to 1.5 having the stated characteristics. The proportions of the phosphate may vary between approximately 25 and 125 parts to 100 parts of the hydrous ammonia. Much heat is evolved as the zinc orthophosphate dissolves. Similar products can be obtained by using the corresponding zinc ortho-arsenates or by using mixtures of the tertiary zinc ortho-phosphates and tertiary zinc ortho-arsenates in similar proportions.

Other zinc phosphates (or arsenates), for instance the secondary $ZnHPO_4$, dissolve far less in ammonia. Or if zinc hydroxide be dissolved in an ammoniacal solution of di-ammonium phosphate (or arsenate), most of the zinc ammonium phosphate $ZnNH_4PO_4$ (or arsenate) formed is almost completely precipitated.

It may be mentioned, furthermore, that the tertiary phosphates and arsenates of the other elements included in the above-mentioned group, form equally clear viscous solutions with ammonia, but that when the solutions are allowed to dry, for example after brushing them in a thin layer on timber, they leave a powdery residue which can easily be wiped off the surface.

The tertiary zinc phosphate and arsenate solutions provided by the present invention, however, behave quite differently. They form clear viscous solutions which on drying, when brushed on substrata of inflammable or other material, leave a hard, glossy film of high refractive index, resembling an organic polymer such as polystyrene. This film or glaze does not consist of zinc ammonium phosphate or tertiary zinc phosphate or arsenate, but shows a much higher content of zinc. When the film material is dried at 105° C., it loses ammonia and water and finally no water soluble parts remain. It is fire resistant and no detectable ions can be traced in a hydrous suspension of it. Its empirical formula is $Zn_3.O.NH_4.(PO_4)_2$ and thus it can only be a complex compound.

If desired, zinc hydroxide may be dissolved in the ammoniacal tertiary zinc ortho-phosphate (ortho-arsenate) solution to increase the zinc content of the solution and film or glaze obtained therefrom.

According to a further feature of the invention, the addition of zinc hydroxide can be wholly or partially substituted by a hydroxide or oxide of one or more of the other elements, than zinc, of the group above mentioned, namely one or more of the following: cupric hydroxide, cadmium hydroxide, nickelic hydroxide, cobaltic hydroxide, manganic hydroxide and silver oxide. The zinc hydroxide or other such addition may be up to about 10% of the dry weight of the initial ortho-phosphate or ortho-arsenate. By adding cupric oxide to the ammoniacal tertiary zinc ortho-phosphate (ortho-arsenate) solution, a transparent film or glaze of deep blue colour can be obtained from the solution on drying. The tertiary zinc ortho-phosphate (ortho-arsenate), however, cannot be replaced by such other elements or their compounds without the ammoniacal solution losing its qualities to form films or glazes of the nature required.

A tentative explanation of the unexpected behaviour of the tertiary zinc ortho-phosphate (ortho-arsenate)-ammonia solutions in yielding hard glossy or varnish like films on drying may be given as follows:

On dissolving hydroxides of the elements of the above specified group in ammonia, the corresponding ammines (ammoniates) are formed, for instance zinc ammine Zn(NH₃)₄.O. Treatment of tertiary zinc ortho-phosphates with ammonia yields in the first instance, by ammonolysis, zinc ammonium phosphate ZnNH₄PO₄ which, however, does not precipitate from the solution, as in the case of the product of the diammonium phosphate and zinc hydroxide reaction mentioned above, but is maintained in solution in the presence of excess ammonia by the zinc ammine which presently forms from splitting-up of the tertiary zinc ortho-phosphate:

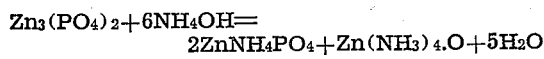

whereby linkages of the two compounds with secondary bonds are formed. When the ammonia and water are allowed to evaporate, the zinc ammine gradually loses its ammonia radicles and, owing to its tendency to replace them, forms with the zinc ammonium phosphate, complex co-ordination compounds which vary in constitution according to the state of ammonia equilibrium. Thus, a mixture of various zinc-ortho-phosphato-zinc-ammines is formed which may be represented by the general formula:

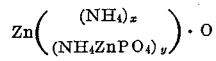

(x+y being equal to 4 but neither being restricted to being a whole number). Such a mixture is in labile equilibrium and, on losing further ammonia on drying, is converted into mixtures of higher zinc polyphosphates. Similar considerations may be applied in the case of the behaviour of the tertiary zinc ortho-arsenate.

The glaze forming quality of the solutions provided by this invention places these solutions, though essentially and uniquely inorganic bodies, in a similar category to the group of organic polymers.

Whereas the linkability of organic polymers is based either on the reactivity of ethenoid groups or multiple bonds of basic and acid groups, or hydroxyl bonds, or sulphur, the polymerizing power of the compounds of this invention lies in the ability of the metal ammines to form co-ordination compounds with ammonium phosphates or, likewise, arsenates.

Within the scope of the invention, are industrial or other useful applications of the hard glossy or varnish like film or glaze forming properties of the solutions provided thereby. Thus the solutions form excellent flame retarding materials. In view of their insolubility in water they can be applied to external or outdoor use. Their content of zinc or other metals or arsenate gives them effective fungicidal properties. No suitable wood preserving material to my knowledge has been either described or used which combines all three desirable qualities of protecting timber against fire, weather and pests. The known water glass compositions are not water resistant and, moreover, are decomposed by the carbon dioxide of the atmosphere, but such is not the case with the compounds of the present invention. In addition, the films are more elastic than silicate films, while by another feature of the invention any tendency of the films to crack or craze under warping stresses in the timber can almost completely be eliminated by adding to and incorporating in the solutions suitable inorganic or organic fillers or pigments, such as for instance, zinc oxide, iron oxide, china clay, mica powder and carbon black, suitably in amount up to 50% of the weight of the solutions. Such solutions, as will be realized, can advantageously be used as paints. A provision of water and fire resisting paints is thereby opened up rendering the invention of extensive commercial utility.

The term "filling material" used in the claims is to be understood as including pigments.

I claim:

1. A water and fire resistant coating composition capable on drying, of forming a hard glossy film resembling an organic polymer, and consisting of a water insoluble transparent liquid and inorganic complex resulting from mixing together between 25 and 125 parts of a compound selected from the class consisting of the tertiary zinc orthophosphates and the tertiary zinc ortho arsenates and 100 parts of hydrous ammonia of 30% to 35% concentration.

2. A water and fire resisting coating composition capable on drying, of forming a hard glossy film resembling an organic polymer, and consisting essentially of an inorganic complex of zinc-orthophosphate-zinc-ammines prepared by mixing between 25 and 125 parts of tertiary zinc orthophosphate with 100 parts of hydrous ammonia of 30% to 35% concentration.

3. A water and fire resisting coating composition capable on drying, of forming a hard glossy film resembling an organic polymer, and consisting essentially of an inorganic complex of zinc-orthophosphate-zinc ammines prepared by mixing between 25 and 125 parts of tertiary zinc orthophosphate with 100 parts of hydrous ammonia of 30% to 35% concentration, together with not to exceed 50% of a material from the class consisting of zinc oxide, iron oxide, china clay, mica powder and carbon black.

4. A water and fire resistant coating composition capable on drying, of forming a hard glossy film resembling an organic polymer, and consisting of a water insoluble transparent liquid and inorganic complex resulting from mixing together between 25 and 125 parts of a compound selected from the class consisting of the tertiary zinc orthophosphates and the tertiary zinc ortho arsenates and 100 parts of hydrous ammonia of 30% to 35% concentration, together with from about 2.5 parts to 12.5 parts of a compound selected from the group consisting of zinc hydroxide, cobaltic hydroxide, manganic hydroxide and silver oxide.

HANS RUDOLPH FRISCH.

REFERENCES CITED

The following references are of record in the file of this patent:

UNITED STATES PATENTS

| Number | Name | Date |
| --- | --- | --- |
| 1,216,736 | Ferguson | Apr. 2, 1918 |
| 1,310,841 | Robinson | July 22, 1919 |
| 2,363,570 | Caprio | Nov. 28, 1944 |

FOREIGN PATENTS

| Number | Country | Date |
| --- | --- | --- |
| 5,893 | Great Britain | of 1900 |
| 385,322 | Great Britain | Dec. 12, 1932 |